C. STEENSTRUP.
METHOD OF MANUFACTURING ELASTIC HELICAL GEAR WHEELS.
APPLICATION FILED MAY 6, 1918.
1,280,893.
Patented Oct. 8, 1918.
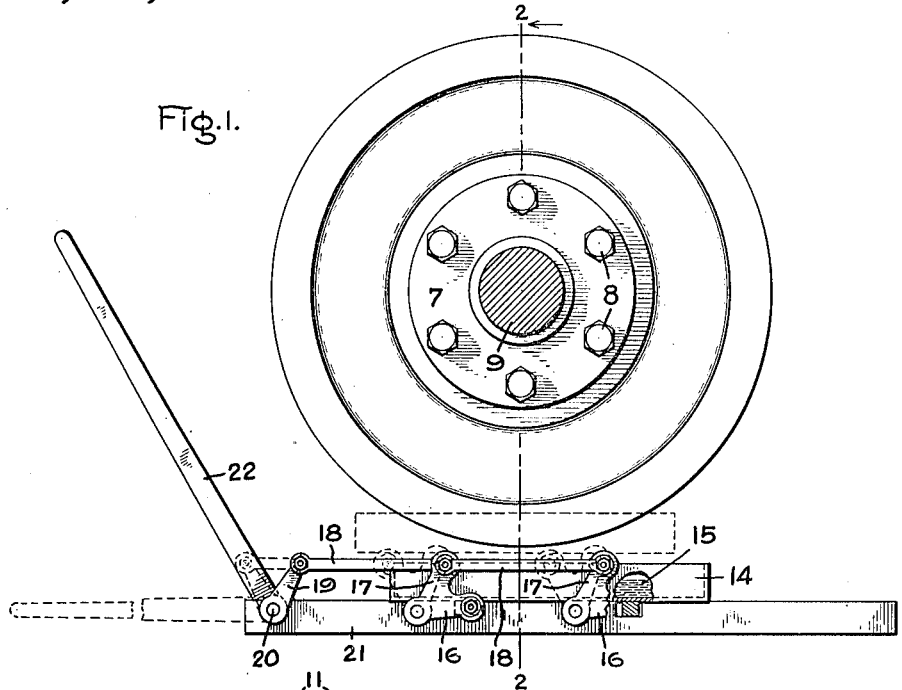
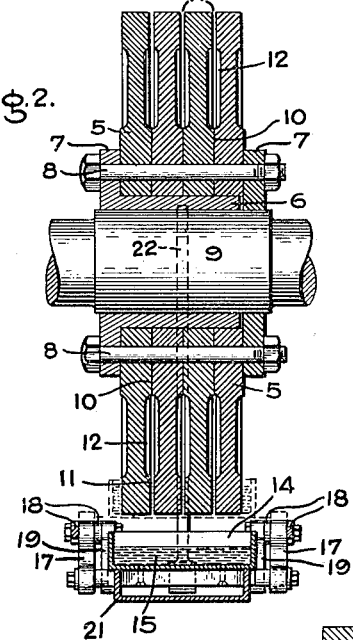
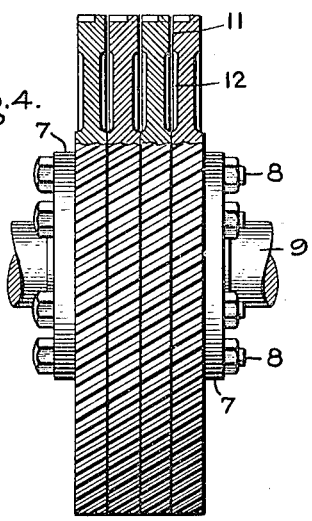
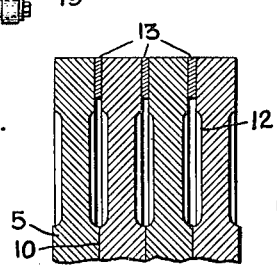
Inventor:
Christian Steenstrup,
by Albert G. Davis
His Attorney.

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

METHOD OF MANUFACTURING ELASTIC HELICAL GEAR-WHEELS.

1,280,893.   Specification of Letters Patent.   Patented Oct. 8, 1918.

Application filed May 6, 1918. Serial No. 232,741.

*To all whom it may concern:*

Be it known that I, CHRISTIAN STEENSTRUP, a citizen of the United States, residing at Schenectady, in the county of Schenectady, State of New York, have invented certain new and useful Improvements in Methods of Manufacturing Elastic Helical Gear-Wheels, of which the following is a specification.

The present invention relates to an improved method of manufacturing elastic helical gear wheels of the type which comprises a plurality of disks or laminæ fixed at their central portions on a common support or shaft and slightly spaced apart at their peripheries to permit of axially yielding under tooth pressure. The teeth of such gear wheels must necessarily be cut with the plates assembled in order to insure that they are correct. It is not possible, however, to cut the teeth on the disks with the peripheral portions spaced apart as they would yield and vibrate under the pressure of the cutting tool to such an extent that the teeth would not be true. In other words when the teeth are being cut the peripheries of the disks or laminæ of which the gear wheel is formed must be backed up so as to present a solid blank for cutting.

In my application, Serial No. 201,018, filed November 9, 1917, I have disclosed a method of manufacturing such gear wheels which comprises broadly filling the spaces at the periphery of the disks with a substance which has a lower melting point than the material of which the disks are formed, then cutting the teeth on the blank and finally removing the substance in said spaces by heating it until it melts and runs out, and in such application I have illustrated one specific method by which the broad method there claimed may be carried out, such specific method dealing particularly with the manner in which the substance is introduced into the spaces between the peripheries of the disks or laminæ.

The object of my present invention is to provide an improved specific method for carrying out the broad method disclosed in such prior application which improved method is simpler than the specific method disclosed in such earlier application and can be more easily and expeditiously carried out. This improved method relates particularly to the manner in which the substance is introduced into the spaces between the peripheries of the disks or laminæ of which the gear wheel is formed.

For consideration of what I believe to be novel and my invention, attention is directed to the following specification and the claims appended thereto.

In the drawing Figure 1 is an end elevation of a gear wheel blank and certain apparatus which may be used in carrying out my improved method; Fig. 2 is a sectional view taken on line 2—2, Fig. 1; Fig. 3 is a radial sectional view on an enlarged scale of a portion of a gear wheel illustrating certain steps of the method, and Fig. 4 is a side elevation partly in section of a finished gear wheel.

According to my improved method the plates, disks or laminæ are formed to the dimensions desired in the finished wheel, assembled on a shaft or holder, and fastened into place. This forms the gear wheel blank and it has the general appearance as shown in Fig. 2. 5 indicates the plates, disks or laminæ and 6 a holder upon which they are bolted between two collars 7 by bolts 8, one of such collars being formed integral with the holder 6 and forming in substance a flange. The holder is mounted on a shaft 9. The disks are in engagement with each other adjacent to their centers as indicated at 10 and are spaced apart at their peripheries as indicated at 11. In the drawing the width of the space between the peripheries of the disks is much exaggerated for purposes of illustration. For example, the width of these spaces in ordinary practice may be only 0.01″. The webs or central portions of the disks 5 are thinner than the hubs and the peripheral portions which leave chambers 12 between the webs with which the spaces 11 communicate.

As in my prior application I fill the spaces 11 with a substance 13 which has a melting point lower than that of the material of which disks 5 are made and which is hard at the temperature of the gear blank at which the teeth are to be cut thereon. I preferably use a substance which is hard at ordinary atmospheric temperatures and has a relatively low melting point. For example, I have found alloys of bismuth, lead and tin, or bismuth, lead, tin and cadmium, which alloys are generally known as "fusible metal", satisfactory. Such an alloy is sufficiently hard at ordinary atmospheric temperatures to firmly back up the disks while the teeth are being cut, and has a low melting point depending upon the proportion of the metals in the alloy as is well known. I preferably employ such an alloy having a melting point lower than the boiling temperature of water. A temperature of 90° C. is satisfactory. As one specific example I may use an alloy comprising 60% bismuth, 15% tin and 25% lead.

I have found that where there is sufficient difference in temperature between the gear wheel blank and the molten substance which is to be introduced into the spaces between the peripheries of the disks or laminæ, such molten substance in running into the spaces between the peripheries of the disks or laminæ will become chilled and will harden. This requires of course that the temperature of the blank be below the temperature at which the substance used hardens. According to my improved method therefor, I provide a tank or receptacle in which is a suitable supply of the molten substance which is to be introduced into the spaces between the peripheries of the disks or laminæ and rotate the periphery of the assembled gear wheel blank through such molten substance. By choosing a proper substance and rotating the gear wheel at a suitable speed, I have found that the molten substance will run between the peripheries of the disks and harden therein due to the fact that it is chilled by the disks.

In Figs. 1 and 2 I have illustrated one apparatus by means of which my improved method may be carried out. 14 indicates a shallow tank or receptacle which is adapted to contain a supply of the molten substance 15, the tank or receptacle 14 is of such dimensions that the gear blank can rotate in it to the desired depth. The arrangement may be such that the gear wheel is lowered into the tank and turned around, or the tank is elevated to bring the molten substance up to the gear wheel. In the present instance I have illustrated the latter arrangement. The tank 14 is pivotally mounted on the arms 16 of bell crank levers, the other arms 17 of such levers being connected to each other and to arms 19 by links 18. Arms 19 are fixed on a shaft 20 which shaft is pivoted in a base plate 21. On shaft 20 is an operating hand lever 22. When the hand lever 22 is in the full line position shown in Fig. 1 the tank 14 rests on the base 21. By pulling down the handle 22 tank 14 will be elevated to the dotted line position shown in Figs. 1 and 2 so as to bring the molten substance up around the lower edge of the gear wheel blank. The gear wheel blank may be mounted on any suitable support and is slowly rotated through the molten substance. As it moves through the molten substance such substance will flow into the spaces 11 and be chilled and harden. As soon as the gear wheel blank has made a complete revolution the tank is lowered to the full line position. The substance 15 may be melted in any suitable manner and poured into the tank 14 or if desired I may provide a suitable flame under the tank for the purpose of melting the substance and maintaining it in a molten condition. After spaces 11 have been filled with the substance the teeth are cut on it in a gear cutting machine in the usual manner. The gear wheel is then heated by placing it in a hot bath or otherwise to melt out the material 13. In the case where a substance 13 is used having a melting point lower than the temperature of boiling water the wheel can conveniently be immersed in hot water to melt the substance 13. It will be understood, however, that it may be heated in any way found desirable or advantageous.

As will be clear the above described method is very simple and can be carried out with simple apparatus. A single tank 14 can be used for any sized gear wheel it being only necessary that the tank be large enough to permit the largest gear wheel manufactured to be lowered into it. The tank 14 can of course be elevated to a height to bring the molten substance up around the periphery of the gear wheel to the desired extent. This method also has the advantage that it can be carried out without specially shaping the spaces 11 thereby saving machine work in manufacturing the disks or plates for the gear wheels.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. The method of manufacturing gear wheels comprising a plurality of disks clamped together at their central portions and slightly spaced apart at their peripheries, which comprises assembling the disks to form a blank, filling the spaces at the peripheries of the disks with a substance which has a lower melting point than the material of which the disks are formed, by rotating the blank in a bath of such substance, cutting teeth on the blank, and removing the substance in said spaces by heating it until it melts and runs out.

2. The method of manufacturing gear wheels comprising a plurality of disks clamped together at their central portions and slightly spaced apart at their peripheries which comprises assembling the disks on a holder to form a blank having spaces between the disks at their peripheries, placing the lower peripheral portion of the blank to the desired depth in a tank of molten substance which has a lower melting point than the material of which the disks are formed, rotating such blank in such substance to fill said spaces, said material being chilled and hardened in said spaces by its contact with the disks, cutting teeth on the blank after the spaces are filled with said substance, and removing said filling substance by heating.

3. The method of manufacturing gear wheels comprising a plurality of disks clamped together at their central portions and slightly spaced apart at their peripheries, which comprises assembling the disks to form a blank, rotating the periphery of the blank in a tank of molten substance which has a melting point lower than that of the material of which the disks are made, said blank being at a temperature lower than that at which the substance hardens whereby when such substance runs between the disks it will be chilled and will harden, cutting teeth on the blank, and removing the substance by heating.

In witness whereof, I have hereunto set my hand this 4th day of May, 1918.

CHRISTIAN STEENSTRUP.